United States Patent
Zhai et al.

(10) Patent No.: US 9,087,382 B2
(45) Date of Patent: *Jul. 21, 2015

(54) ZONE-BASED TONE MAPPING

(75) Inventors: Jiefu Zhai, Cupertino, CA (US); Joan Llach, Cesson-Sevigne (FR)

(73) Assignee: THOMSON LICENSING, Issy les Moulineaux (FR)

(*) Notice: Subject to any disclaimer, the term of this patent is extended or adjusted under 35 U.S.C. 154(b) by 528 days.

This patent is subject to a terminal disclaimer.

(21) Appl. No.: 13/381,224

(22) PCT Filed: Jun. 29, 2010

(86) PCT No.: PCT/US2010/001863
§ 371 (c)(1),
(2), (4) Date: Dec. 28, 2011

(87) PCT Pub. No.: WO2011/002505
PCT Pub. Date: Jan. 6, 2011

(65) Prior Publication Data
US 2012/0113130 A1    May 10, 2012

Related U.S. Application Data

(60) Provisional application No. 61/269,760, filed on Jun. 29, 2009.

(51) Int. Cl.
G09G 5/02 (2006.01)
G06T 5/00 (2006.01)

(52) U.S. Cl.
CPC ....... G06T 5/008 (2013.01); *G06T 2207/10024* (2013.01); *G06T 2207/20012* (2013.01); *G06T 2207/20208* (2013.01)

(58) Field of Classification Search
CPC ....... G06F 3/14; G06F 9/4443; G06T 11/001; G06T 15/04; G06T 15/005; G06T 5/007; G06T 5/008
See application file for complete search history.

(56) References Cited

U.S. PATENT DOCUMENTS

| 5,467,404 A | 11/1995 | Vuylsteke et al. |
| 5,717,789 A | 2/1998 | Anderson et al. |

(Continued)

FOREIGN PATENT DOCUMENTS

| CN | 101030298 A | 9/2007 |
| CN | 101082992 A | 12/2007 |

(Continued)

OTHER PUBLICATIONS

Impoco G et al., "Adaptive Reduction of the Dynamics of HDR Video Sequences", Image Processing, 2005. ICIP 2005, IEEE International Conference On, Piscataway, NJ.

(Continued)

*Primary Examiner* — Mark Zimmerman
*Assistant Examiner* — Michelle Chin
(74) *Attorney, Agent, or Firm* — Robert D. Shedd; Richard LaPeruta

(57) ABSTRACT

A method of tone mapping high dynamic range images for display on low dynamic range displays wherein a high dynamic range image is first accessed. The high dynamic range image is segmented into different regions such that each region is represented by a matrix, where each element of the matrix is a weight or probability of a pixel. An exposure of each region is determined or calculated and the exposure values are applied to the regions responsive to the weight or probability. The different regions are then fused together to obtain a final tone mapped image.

14 Claims, 5 Drawing Sheets

(56) References Cited

U.S. PATENT DOCUMENTS

| | | | |
|---|---|---|---|
| 5,805,721 | A | 9/1998 | Vuylsteke et al. |
| 6,359,617 | B1 | 3/2002 | Xiong |
| 6,593,970 | B1 | 7/2003 | Serizawa et al. |
| 6,775,407 | B1 | 8/2004 | Gindele et al. |
| 6,839,462 | B1 | 1/2005 | Kitney et al. |
| 7,010,174 | B2 | 3/2006 | Kang et al. |
| 7,471,826 | B1 | 12/2008 | Navon et al. |
| 7,636,496 | B2 | 12/2009 | Duan et al. |
| 7,821,570 | B2 | 10/2010 | Gallagher et al. |
| 8,081,208 | B2 | 12/2011 | Inomata et al. |
| 8,135,230 | B2 | 3/2012 | Rempel et al. |
| 8,346,009 | B2 | 1/2013 | Zhai et al. |
| 2005/0117799 | A1 | 6/2005 | Fuh et al. |
| 2006/0210150 | A1 | 9/2006 | Riccardi |
| 2006/0262363 | A1 | 11/2006 | Henley |
| 2009/0034868 | A1 | 2/2009 | Rempel et al. |
| 2009/0169102 | A1 | 7/2009 | Zhang et al. |
| 2011/0229022 | A1* | 9/2011 | Yamada .................. 382/162 |

FOREIGN PATENT DOCUMENTS

| | | |
|---|---|---|
| EP | 1758058 | 2/2007 |
| JP | 5244508 | 9/1993 |
| JP | 2008294539 | 12/2008 |
| WO | 2007082562 A2 | 7/2007 |

OTHER PUBLICATIONS

Mantiuk R et al., "Backward Compatible High Dynamic Range MPEG Video Compression", ACM Transactions on Graphics (TOG); Jul. 30, 2006, pp. 713-723.

Manituk R et al., "Perception-Motivated High Dynamic Range Video Encoding", ACM Transactions on Graphics (TOG), vol. 23, No. 3, Aug. 1, 2004, pp. 733-741.

Krawczyk et al., "Lightness Perception in Tone Reproduction for High Dynamic Range Images", In: Proc. of Eurographics '05 (Computer Graphics Forum, vol. 24), 2005.

Krawczyk et al., "Computational Model of Lightness Perception in High Dynamic Range Imaging", Human Vision and Electronic Imaging XI, Proc. of SPIE-IS&T Electronic Imaging, SPIE vol. 6057, 2006.

Lichinski et al., "Interactive Local Adjustment of Tonal Values", Association for Computing Machinery, Inc., 2006.

Reinhard et al., "Photographic Tone Reduction for Digital Images", Association for Computing Machinery, Inc. 2002.

Yee et al., "Segmentation and Adaptive Assimilation for Detail-Preserving Display of High-Dynamic Range Images", The Visual Computer, 2003.

Devlin K et al., "Dynamic Range Reduction Inspired by Photoreceptor Physiology," IEEE Transactions on Visualization and Computer Graphics, vol. 11, No. 1, Jan./Feb. 2005.

European Search Report dated Sep. 16, 2010.

Agarwala et al., "Interactive Digital Photomontage," The ACM SIGGRAPH 2004 Conference Proceedings, 9 pages.

Burt et al., "Enhanced Image Capture Through Fusion," IEEE 1993, David Sarnoff Research Center, Princeton, NJ, pp. 173-182.

Burt et al., "The Laplacian Pyramid as a Compact Image Code," IEEE Transactions on Communications, vol. COM-31, No. 4, Apr. 1983, pp. 532-540.

Chiu et al., "Spatially Nonuniform Scaling Functions for High Contrast Images," Proceedings from Graphics Interface '93, pp. 245-253, Toronto, May 1993.

Dippel et al., Multiscale Contrast Enhancement for Radiographies: Laplacian Pyramid Versus Fast Wavelet Transform, IEEE Transactions on Medical Imaging, vol. 21, No. 4, Apr. 2002.

Drago et al., "Adaptive Logarithmic Mapping for Displaying High Contrast Scenes," Computer Graphics Forum, vol. 22(3), 9 pages, The Eurographics Assoc. and Blackwell Publishers 2003.

Durand et al., "Fast Bilateral Filtering for the Display of High-Dynamic-Range Images," ACM Transactions on Graphics, 21(3): 257-266, 2002.

Fairchild et al., "The iCAM Framework for Image Appearance, Image Differences, and Image Quality," Journal of Electronic Imaging, 13: 126-138, 2004, 34 pages.

Fattal, et al., "Gradient Domain High Dynamic Range Compression," ACM Transactions on Graphics, 21(3): pp. 249-256, 2002.

Mertens et al., "Exposure Fusion," Pacific Graphics 2007, 9 pages.

Seetzen et al., "High Dynamic Range Display Systems," ACM SIGGRAPH Conference Proceedings, ACM Press, Aug. 9, 2004, pages 1-9.

Toet, "Adaptive Multi-Scale Contrast Enhancement Through Non-Linear Pyramid Recombination", Pattern Recognition Letters, No. 11, Amsterdam,NL, pp. 735-742, Nov. 1990.

Vuylsteke et al., Multiscale Image Constrast Amplification (MUSICATM), SPIV, vol. 2167, Image Processing, 1994.

Wikipedia, "Pyramid (image processing)," http://en.wikipedia.org/wiki/Pyramid . . . (image . . . processing), 2 pages, Sep. 2014.

\* cited by examiner

ZONE-BASED TONE MAPPING

CROSS-REFERENCE TO RELATED APPLICATIONS

This application claims the benefit, under 35 U.S.C. §365 of International Application PCT/US2010/001863 and filed Jun. 29, 2010, which was published in accordance with PCT Article 21(2) on Jan. 6, 2011, in English and which claims the benefit of U.S. provisional patent application No. 61/269,760, filed Jun. 29, 2009.

FIELD OF THE INVENTION

The invention relates to the tone reproduction of high dynamic range (HDR) content on low dynamic range (LDR) displays, which is also known as the tone mapping problem. In particular, at least one embodiment includes a method that (1) automatically generates displayable LDR images from HDR data that match the human perception of the HDR scene and (2) offers user-friendly controls for manual adjustments.

BACKGROUND OF THE INVENTION

The tone mapping problem relates to tone reproduction of high dynamic range (HDR) content on low dynamic range (LDR) displays. In most applications, the tone mapping process must usually meet two requirements: keep image details, e.g. local contrast; and maintain the appearance of relative brightness. Current known work on tone mapping focuses on the first requirement and simply neglects the second one, which is usually the most important from the artists' perspective. Additionally, the currently available tone mapping algorithms do not allow manipulating the tone of different parts of the picture and thus often fail to match the sensation of the original HDR content.

High dynamic range (HDR) has received much attention in recent years as an alternative format for digital imaging. The traditional Low Dynamic Range (LDR) image format was designed for displays compliant with ITU-R Recommendation BT 709 (a.k.a. Rec. 709), where only two orders of magnitude of dynamic range can be achieved. Real world scenes, however, have a much higher dynamic range, around ten orders of magnitude in daytime, and the human visual system (HVS) is capable of perceiving 5 orders of magnitude at the same time.

The amount of visual content available in HDR format is increasing: the latest advances in digital sensors and film stock allows content creators to capture images with very high dynamic range, and computer generated graphics (e.g. animation films, visual effects and games) allow creating visual content with virtually unlimited dynamic range. HDR displays, however, are not mainstream devices yet; a few HDR display devices are already available as prototypes and top-of-the-line HDTVs, but the number of such displays is still very small compared to the widely used LDR displays.

In order to display an HDR image on a LDR display device, a tone mapping method is employed to map the HDR image, which is usually available as radiance, to 8 bit RGB index numbers. The tone mapping process is not obvious because it has to simulate the process that happens in the HVS so that the tone mapped LDR image can deceive the HVS into believing it is close enough to the original HDR image. This requires the tone mapping algorithm to be able to maintain both the local contrast and the perceptual brightness.

Tone mapping for HDR image has been studied in recent years in computer graphics as well as in image/video processing communities. Roughly speaking, tone mapping methods can be classified into two primary categories: global tone mapping and local tone mapping.

Global tone mapping uses a global curve to map radiance to image intensity. Although it has the advantages such as low complexity and easy manual control, it is not able to keep all the details when it comes to considerably high dynamic range. Therefore, global tone mapping is not suitable for applications that require very high quality output (like post-production).

Local tone mapping methods, on the other hand, offer a higher quality result by compressing each individual pixel according to local image characteristics. In particular, these methods try to simulate the visual adaptation that happens in the HVS, but in practice most of them do not mimic the behavior of the HVS explicitly. Instead, they make simple assumptions about the HVS and then try to compress the dynamic range of the image using these assumptions to get a visually good-looking result. Even if with careful fine-tuning of the local tone mapping method it is possible to generate convincing results for a relatively wide range of HDR images, the understanding of visual adaptation is still far from complete. Therefore, there is no algorithm that behaves like the human eye. Additionally, these methods do not offer good manual control of the tone mapping process, severely limiting the creativity typically involved in tone correction processing.

Tone mapping is not only studied by image processing researchers, but also by painters as well as film photographers. They face the same problem of using a limited dynamic range media (i.e. canvas for painters and print paper for photographers) to represent the high dynamic range scenes. Referring to FIG. 1, here we review the "Zone System" 100, which is a photographic technique formulated by Ansel Adams and Fred Archer. The Zone System assigns numbers from 0 through 10 to different perceptual brightness, with 0 representing black, 5 middle gray, and 10 pure white. These values are known as zones. In the theory of the Zone System, a photographer first identifies the key elements in the scene and places these elements on the desired zones.

This process relies on the perception of the scene rather than the measurement of the radiance. Then a light meter is used to measure the radiance for each key element in the scene. As there can be only a single exposure value per shot, an exposure value is chosen such that the most important element is mapped to the desired zone. As a result, other (also important) elements may be mapped to the "wrong" zone, becoming either too dark or too bright. Afterwards, in the printing process, this problem is fixed by applying a "dodge and burn" operation, which is a printing technique where some light is withheld from a portion of the print during development (dodge), or more light is added to that region (burn). Therefore, a key element that is mapped to a lower zone than the desired one will be exposed in the light longer than the rest part of the picture. Similarly, the key element that is mapped to a higher zone than the desired one will be exposed less. This local processing will guarantee that the key elements of the picture are mapped to the desired zone in the final output. In other words, the perceptual brightness of these key elements remains consistent with how they look like in real life.

This approach can be used with digital images, but there is no method with good performance in automatic mode that at the same time provides intuitive control in a user-assisted mode.

SUMMARY OF THE INVENTION

A method of tone mapping high dynamic range images for display on low dynamic range displays is provided wherein a high dynamic range image is first accessed. The high dynamic range image is segmented then into different regions such that each region is represented by a matrix, where each element of the matrix is a weight or probability of a pixel. An exposure of each region is determined or calculated and the exposure values are applied to the regions responsive to the weight or probability. The different regions are then fused together to obtain a final tone mapped image. The method can further comprise the step of identifying or establishing different perceptual brightness levels for the high dynamic range images or for the final tone mapped image. Additionally, the method can comprise any of the steps of determining regions responsive to luminance data; establishing anchor values, wherein each anchor value establishes one of the regions; and tone mapping is performed based on individual color channels. Tone mapping can be performed based on a luminance channel and then applied to color channels by post-processing and tone mapping can performed based on individual color channels. The method can

BRIEF DESCRIPTION OF THE DRAWINGS

The invention will now be described by way of example with reference to the accompanying figures of which.

DETAILED DESCRIPTION OF THE EMBODIMENTS

Analogous to the concept of "Zone System" developed in film photography for traditional manual tone mapping, the method may be generally described in four steps:
  a. identify key elements in the picture;
  b. map each key element to a zone respectively;
  c. measure the radiance for each key element;
  d. decide the global exposure value; and
  e. dodge and burn in the printing process so that each key element is in the right zone in final print.

In order to describe the method in greater detail, one can first define the input and output of the tone mapping problem. First, assume the input is the radiance of the scene in a known color space with known primary colors. The radiance data can be absolute radiance or linearly scaled radiance, which is the case when the HDR data is not calibrated. The output is the tone-mapped image.

The luminance image can be computed from the HDR data. If the HDR data is in XYZ color space, the Y component can be used as luminance image. If the HDR data uses the same primary colors as Rec. 709, the conversion from RGB color space may be done as follows:

$$L(i,j)=0.2126*R(i,j)+0.7152*G(i,j)+0.0722*B(i,j)$$

Other conversions between RGB (or other color spaces) and the luminance image can be used depending on the format of the input picture.

Next define the simplest form of tone mapping: single exposure. Without loss of generality, suppose the HDR data has only one color channel, which could be the luminance image. With linear scaling, an "anchor point" is specified. A pixel will be saturated and mapped to one if the luminance of that pixel exceeds the anchor point, otherwise it will be mapped to a value between 0 and 1. Therefore, the linear scaling single exposure may be defined as:

$$I(i,j) = S\left(\frac{L(i,j)}{A}\right)$$

where A is the anchor point and $S(x)$ can be defined as:

$$S(x) = \begin{cases} 1 & x > 1 \\ x^{1/\rho} & \text{otherwise} \end{cases}$$

where $\rho$ typically takes values in the range [2.2, 2.4] and represents the gamma of the output device (where the tone mapped image will be shown).

The resulting image I can be quantized and displayed on a conventional LDR display. Note that other definitions of $S(x)$ are possible: e.g. an S-shaped curve can be used instead of the power function. In general, any global mapping curve can be used for S.

Figure 2:
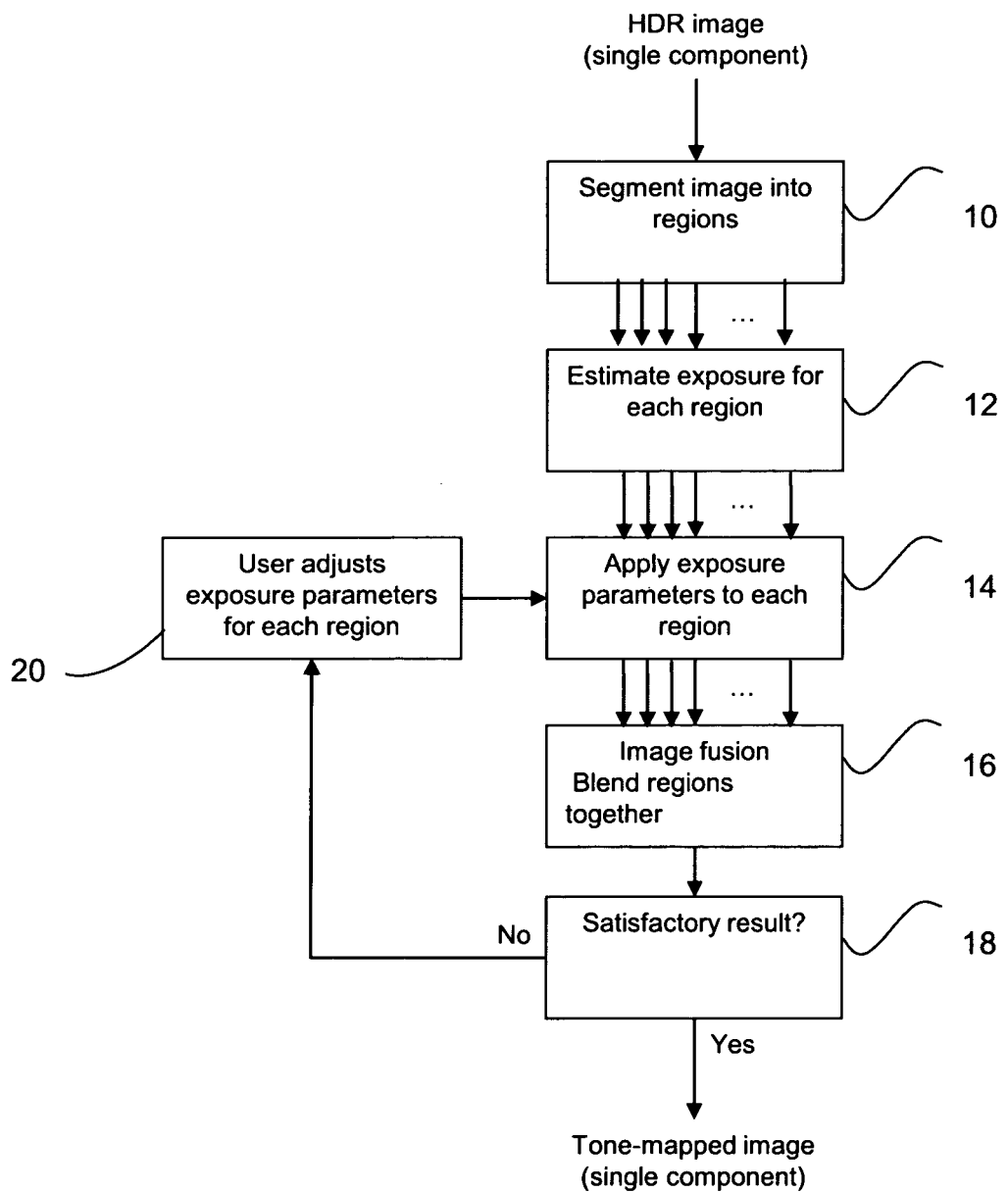
FIG. 2 is flow diagram of a zone based tone mapping method according to the invention.

The Zone System is then applied to digital tone mapping. As illustrated in FIG. 2, a description of the main steps follows. The input high dynamic range (HDR) image is first divided into different regions at step 10. It can be a hard segmentation or a fuzzy one. In either case, each region can be represented by a matrix, where each element of the matrix is the probability (weight) of a pixel. If a hard segmentation is used, image pixels belong to a single region and therefore the probability is either 0 or 1. If a fuzzy segmentation is used, each pixel can spread over several (even all) regions, and therefore the probability can take any value between 0 and 1.

Then, at step 12, the algorithm decides to which zone each region will be mapped. This essentially estimates the exposure for each region. The mapping between region and zone can also be done with user interaction by providing an appropriate user interface.

Next, at step 14, each region is exposed with its own exposure parameters.

Afterwards, at step 16, a fusion or blending process is employed to generate the final tone mapped image by fusing the different regions together (each exposed with its own exposure value) using the weights obtained in step 10.

Optionally, at steps 18 and 20, the user can check the look of the tone mapped image and make changes to the exposure value of one or more regions and then repeat steps 14-18 until the result is satisfactory through an appropriate user interface to changes to parameters in the steps.

For video tone mapping, the process can be carried out for one key frame in a scene and then applied with the same parameters to all frames in the scene.

Embodiments for each of the main steps will now be described in greater detail.

Segmentation of the Image at Step 10.

The purpose of segmentation is to divide the image into regions such that each region contains objects that should be mapped to the same zone. In other words, each region should need a single exposure. The segmentation can be done in a number of ways using various image processing techniques. Here a simple yet efficient approach will be described. First, the luminance image is computed from the HDR radiance data. The segmentation is carried out on the luminance image only. The average, maximum and minimum luminance of the image is then computed as follows:

$$L_{avg} = e^{\frac{1}{N}\Sigma_{i,j}ln(L(i,j))}$$

$$L_{max} = \max_{R_{max}}(L)$$

$$L_{min} = \min_{R_{min}}(L)$$

where Rmin and Rmax are two predefined percentages, maxR(X) is the smallest value in X larger or equal than R percent of the values in X, and minR(X) is the largest value in X smaller or equal than R percent of the values in X.

As mentioned above, within each region, pixels should have the same exposure. A series of anchor points $A_i$ (i=1 ... N) are defined such that each $A_i$ is used to define a region and also generate a single exposure image.

In this embodiment, the anchor points are chosen as:

$$A_1 = L_{avg}/E \quad A_{n+1} = 4 \cdot A_n (n=2 \ldots N-1)$$

where E in the above equation is a constant and can take the value of, for example, 8. The number of regions N in the above equation can be computed as below, which is able to cover all the luminance range.

$$N = \left[\left(\log_2\left(\max\left(\frac{L_{max} \cdot E}{L_{avg}}, 1\right)\right) + 1\right)/2\right]_{+1}$$

It's easy to see that the distance between two neighboring anchor points is two "stops" in terms of photography.

Once the anchor point of each region is known, the weight of each pixel is computed for each region. In general, for each region (defined by the corresponding anchor point $A_i$), the closest the value of a pixel in the single exposure image is to 0.5, the larger the weight of that pixel for that region (defined by the corresponding anchor point $A_i$).

Thus, the weight of pixel at location (i, j) for region n (defined by anchor point $A_n$) can be computed as below:

$$W_n(i,j) = Ce^{-\frac{\left(S\left(\frac{L(i,j)}{2A_n}\right)-0.5\right)^2}{\sigma^2}}$$

where C is a normalization factor and it is defined as:

$$C = \frac{1}{\sum_n e^{-\frac{\left(S\left(\frac{L(i,j)}{2A_n}\right)-0.5\right)^2}{\sigma^2}}}$$

The above computed weights take values in the range [0,1] and hence define a fuzzy segmentation of the luminance image into N regions. This means each region might contain all the pixels in the image, although only a portion of them might have large weights.

In another implementation, the weights are binarized (i.e. make them either 0 or 1), resulting in a hard segmentation:

$$p = \underset{n}{\text{ArgMax}}(W_n(i,j)) \quad n = 1, 2, \ldots, N$$

$$W_p(i,j) = 1 \quad W_q(i,j) = 0(q \neq p)$$

Note that the anchor points $A_n$ as well as the weights $W_n$ are fixed once the segmentation is done. We will see in the next section that the exposures for each region can be adjusted while the weights remain unchanged.

Estimation of Exposure at Step 12.

Once segmented each region is mapped to a zone. In other words, an anchor point is defined for each region so that after single exposure each region can be properly exposed.

To decide which zone each region should be mapped to is a very subjective task because this depends on how the HVS completes the visual adaptation. In the traditional zone system, mapping key elements to zones is decided visually by the photographer.

Many different algorithms can be used to estimate the exposure of each region. In a simple implementation, all regions are mapped to middle gray and then the user can interactively change the anchor points. This means the estimated exposure is the same anchor point value as that being used to define the region:

$$A_n' = 2^{\lambda_n} A_n \quad n=1,2,\ldots,N$$

where $\lambda_n$ is an variable that can be changed by the user.

The default value for $\lambda_n$ is zero, but the method allows manually modifying it in order to reach the desire look.

Applying Exposure Parameters at Step 14

Once the user have the segmentation of the HDR image and the anchor points for each region, the corresponding LDR images may be generated from the HDR data using the exposure estimated above:

$$I_n = S\left(\frac{L}{A_n'}\right)$$

Image Fusion and Enhancement at Step 16

The goal of this step is to blend together all the regions (each exposed with its own exposure parameters). Several fusion methods are possible; a few are described below.

Image Fusion

First Embodiment

Compute the weighted average of the LDR images to generate the tone mapping result T as follows:

$$T = \sum_n W_n I_n$$

This is a low complexity method. Unfortunately, this method is very sensitive to image weights, resulting in visible artifacts in most implementations.

Image Fusion

Alternate Embodiment

A more sophisticated fusion process combines these LDR images. Another image fusion method follows a multi-resolution approach using pyramids. It has higher complexity but it is much more robust to the weights (i.e. the segmentation of the image into regions) resulting in nearly seamless transition between regions.

Tone Mapping of Color HDR Images

Figure 1:
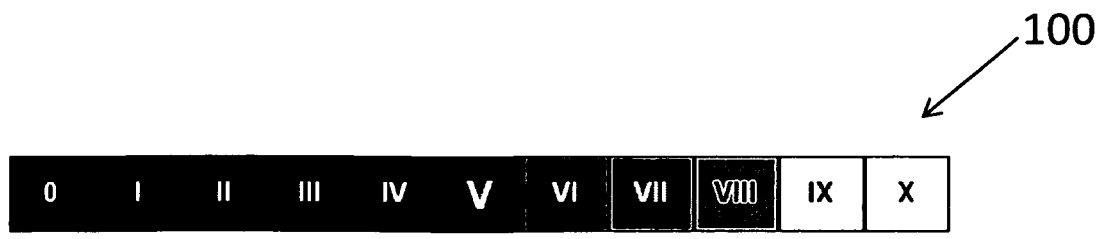
FIG. 1 is diagram of a known zone system scale.
Figure 3:
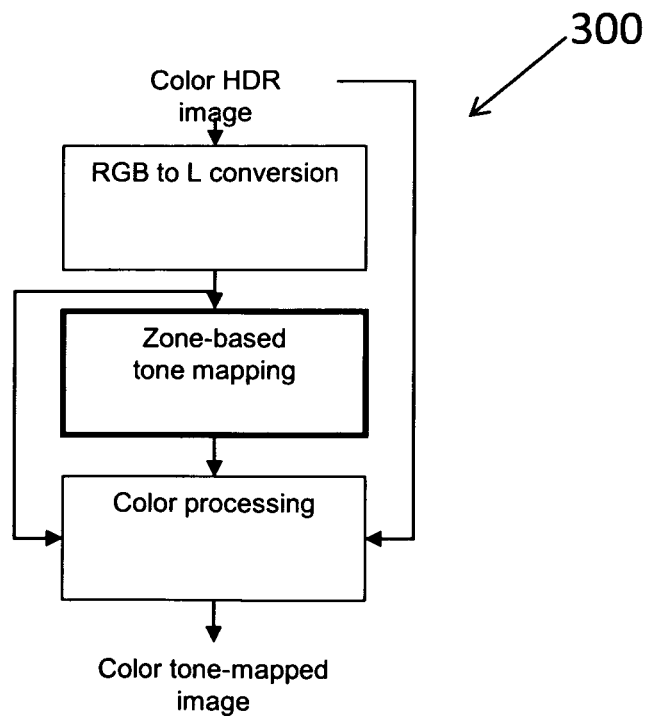
FIG. 3 is a flow diagram of an application of the method of FIG. 2 for color HDR images.

FIG. 3 shows how the proposed zone-based tone mapping approach 300 can be used to tone map color HDR images. First, if it is assumed that the color HDR image is in RGB color space, the luminance image is computed using the equation provided above. Then, luminance image is processed according to the described method framework. Finally, the color processing step applies the tone mapping of the luminance image to each color component. In a particular implementation, the color processing step scales each pixel of each color component by the same amount wherein the corresponding pixel of the luminance image has been scaled, and then performs gamma correction and quantization. This process is summarized by the following equations:

$$\begin{cases} R' = Q\left(\left(R \cdot \frac{(L')^\gamma}{L}\right)^{1/\gamma}\right) \\ G' = Q\left(\left(G \cdot \frac{(L')^\gamma}{L}\right)^{1/\gamma}\right) \\ B' = Q\left(\left(B \cdot \frac{(L')^\gamma}{L}\right)^{1/\gamma}\right) \end{cases}$$

where $Q(.)$ denotes the quantization function, and $\gamma$ is the gamma of the output device.

Figure 5:
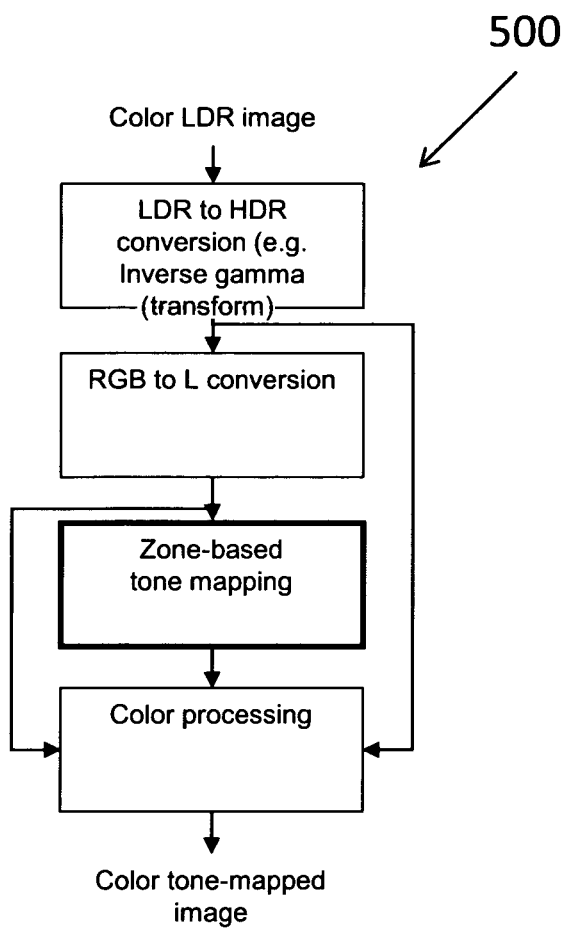
FIG. 5 is a flow diagram showing tone correction of LDR images using the method of FIG. 2; and, FIG. 6 shows a pair of sample images wherein one has been enhanced according to the methods of the invention.

Tone correction of color LDR images may be accomplished using the zone based tone mapping methods described above. These methods may be applied to automatically or manually correct LDR images. As illustrated in process flow 500 of FIG. 5, an additional step compared to the processing of HDR images is the conversion from LDR to HDR, which can be done using inverse quantization and inverse gamma transform:

$$\begin{cases} R = (Q^{-1}(R'))^\gamma \\ G = (Q^{-1}(G'))^\gamma \\ B = (Q^{-1}(B'))^\gamma \end{cases}$$

Figure 4:
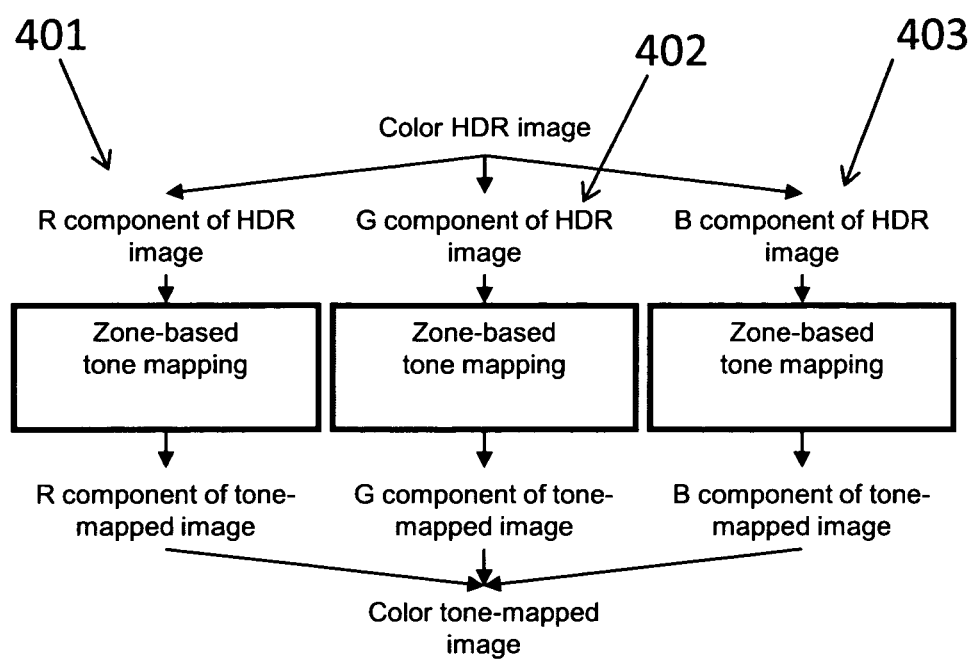
FIG. 4 is a flow diagram of another application of the method of FIG. 2 for color HDR images.

Some variations on this step are possible. For example, tone mapping may be performed on each color component independently (e.g. a red color mapping flow 401, green color mapping flow 402, and blue color mapping flow 403, instead of using the luminance image as best shown in FIG. 4. Also, tone mapping may be performed on a color component, instead of using the luminance image.

In yet another variation, a single component (e.g., one of the color components or luminance image) may be used in some steps, and color components may be used in other steps. For instance, luminance for steps 10-12, and color components for steps 14-16.

Figure 6:
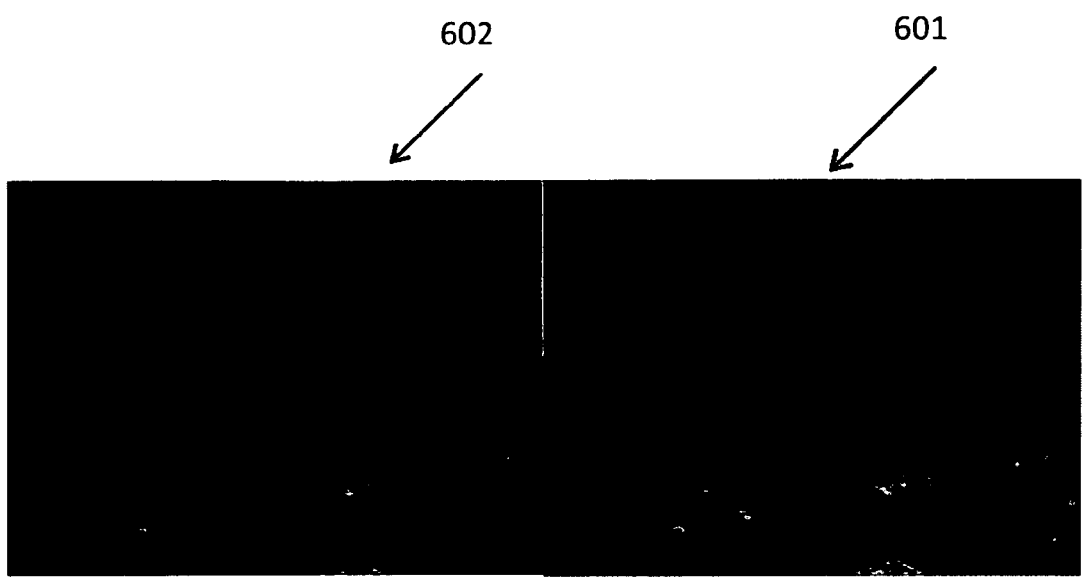

The zone based tone mapping methods described here results in enhanced display of images, especially on converting an HDR image to an LDR image. An example of these results is shown in FIG. 6 wherein the right side image 601 has been processed according to the methods described above and the left side image 602 has not. Here, improved tonal variation can be seen both in the sky and land portions of the image.

Alternate embodiments having one or more implementations with particular features and aspects will now be described. However, features and aspects of described implementations may also be adapted for other implementations.

For example, these implementations and features may be used in the context of coding video and/or coding other types of data. Additionally, these implementations and features may be used in the context of, or adapted for use in the context of, the H.264/MPEG-4 AVC (AVC) Standard, the AVC standard with the MVC extension, the AVC standard with the SVC extension, a 3 DV standard, and/or with another standard (existing or future), or in a context that does not involve a standard.

Additionally, implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A method of tone mapping high dynamic range images for display on low dynamic range displays comprising:
    accessing a high dynamic range image;
    segmenting the high dynamic range image into different regions such that each region is represented by a matrix, where each element of the matrix is a weight of a pixel;
    determining exposure of each region according to a zone system that assigns one of a fixed set of discrete exposure values to each region;
    applying exposure values to the regions responsive to the weight;
    fusing the different regions together to obtain a final tone mapped image; and
    providing a user interface for the user to adjust a zone for individual regions.

2. The method of claim 1, further comprising establishing different perceptual brightness levels for the high dynamic range images.

3. The method of claim 1, further comprising establishing different perceptual brightness levels for the final tone mapped image.

4. The method of claim 1, further comprising determining regions responsive to luminance data.

5. The method of claim 4, further comprising establishing anchor values, wherein each anchor value establishes one of the regions.

6. The method of claim 1, wherein tone mapping is performed based on a luminance channel and then applied to color channels by post-processing.

7. The method of claim 1, wherein tone mapping is performed based on individual color channels.

8. An apparatus for tone mapping high dynamic range images for display on low dynamic range displays comprising:
    a processor that accesses a high dynamic range image, the processor segments the high dynamic range image into different regions such that each region is represented by a matrix, where each element of the matrix is a probability of a pixel; and
    a user interface for a user to adjust a zone for individual regions;
    wherein:
        the processor calculates exposure of each region according to a zone system that assigns one of a fixed set of discrete exposure values to each region;
        the processor applies exposure values to the regions responsive to the probability; and
        the processor fuses the different regions together to obtain a final tone mapped image.

9. The apparatus of claim 8, wherein the processor identifies different perceptual brightness levels for the high dynamic range images.

10. The apparatus of claim 8, wherein the processor identifies different perceptual brightness levels for the final tone mapped image.

11. The apparatus of claim 8, wherein the processor determines regions responsive to luminance data.

12. The apparatus of claim 11, wherein the processor establishes anchor values, wherein each anchor value establishes one of the regions.

13. The apparatus of claim 8, wherein the processor performs tone mapping based on a luminance channel and then applies the tone mapping to color channels by post-processing.

14. The apparatus of claim 8, wherein the processor performs tone mapping based on individual color channels.

* * * * *